Figure 1:
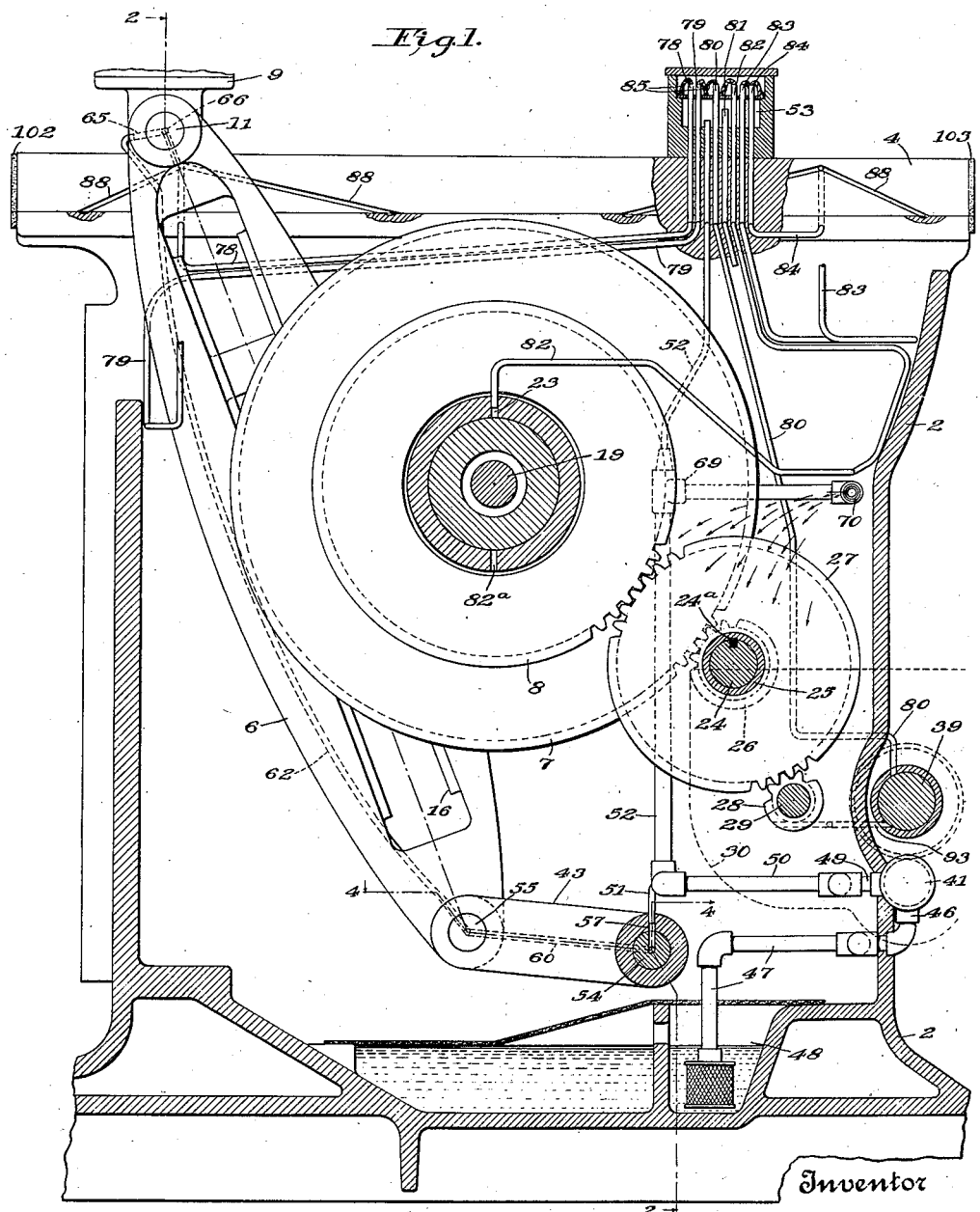

Nov. 11, 1930.  H. W. JACOBSON  1,781,110
LUBRICATION SYSTEM FOR SHAPING MACHINES
Filed Jan. 29, 1925  3 Sheets-Sheet 1

Inventor
Hugo W. Jacobson
By Attorney
Albert F. Nathan

Nov. 11, 1930.   H. W. JACOBSON   1,781,110
LUBRICATION SYSTEM FOR SHAPING MACHINES
Filed Jan. 29, 1925   3 Sheets-Sheet 2

Inventor
Hugo W. Jacobson
By Attorney
Albert F. Nathan

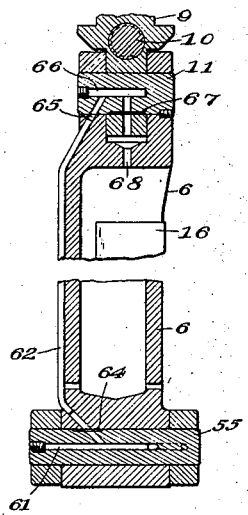
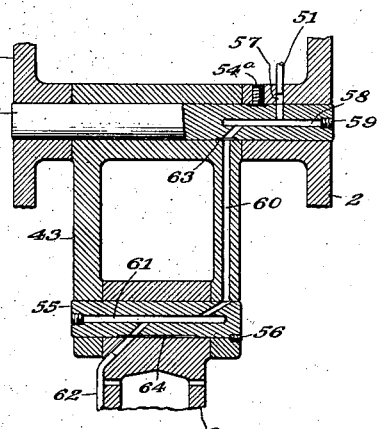
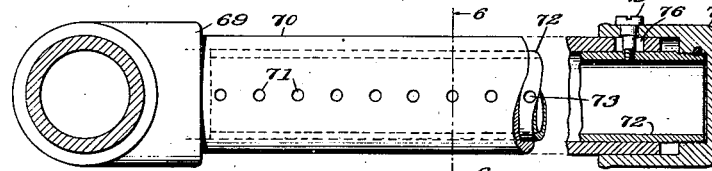
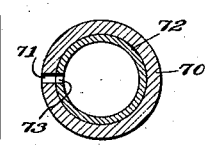
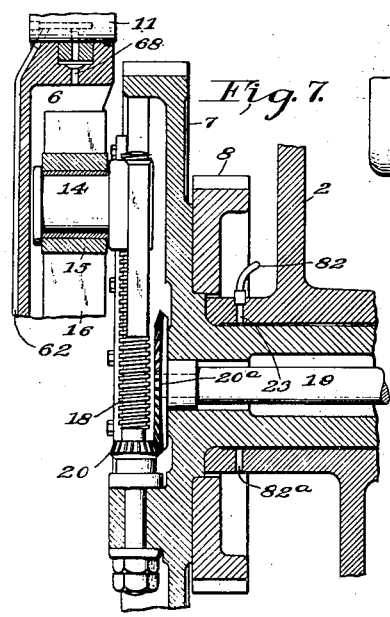

Patented Nov. 11, 1930

1,781,110

UNITED STATES PATENT OFFICE

HUGO W. JACOBSON, OF ARLINGTON, NEW JERSEY, ASSIGNOR TO GOULD & EBERHARDT, OF NEWARK, NEW JERSEY, A CORPORATION OF NEW JERSEY

LUBRICATION SYSTEM FOR SHAPING MACHINES

Application filed January 29, 1925. Serial No. 5,542.

My invention deals with lubricating systems for shaping machines and is concerned chiefly in the supplying of lubricating material not only to the various gear wheels, guideways and stationary bearings on a shaping machine but also in supplying lubricating material under pressure to the bearing surfaces of the oscillating arm which operates the reciprocating ram.

One object of my invention is to provide a shaping machine with a lubricating system that shall supply lubricating material under pressure to the bearing with the frame of the link connected to the oscillating arm and to the bearings at each end of the oscillating arm and that shall automatically supply lubricating material to the guideways for the reciprocating ram and to the various gears and bearing surfaces on the machine.

Another object of my invention is to provide a shaping machine with a lubricating system having a single lubricating pump for supplying lubricating material under a predetermined pressure to the bearing surfaces of the oscillating arm and the link connected to the arm and for supplying lubricating material to a reservoir located at the upper part of the shaping machine.

A further object of my invention is to provide a shaping machine with a lubricating system that shall have a pressure line connected to a pump for supplying lubricating material to the bearings for the oscillating arm and the link connected to the oscillating arm and a second pressure line connected to said pump for supplying lubricating material to a main supply reservoir located at the top of the machine and that shall have an outlet connected to the second pressure line for varying the pressure of the lubricating material supplied by each of said pressure lines.

In building shaping machines it has been customary to provide a gravity lubricating system for a number of the bearing surfaces on the machine, to provide oil cups for other bearing surfaces, and to depend upon the operator of the machine to supply lubricating material to a number of oil holes. The supplying of the various bearing surfaces on the shaping machine by such a system is dependent to a great extent upon the will of the operator of the machine. Accordingly, trouble is experienced at times by reason of supplying insufficient lubricating material to some of the bearing surfaces. In some cases a number of pressure pumps have been provided for supplying lubricating material to the various bearing surfaces of the shaping machine. A pump is sometimes utilized for supplying lubricating material to the various gears and bearing surfaces which are directly associated with the frame of the machine and a second pump is provided for supplying lubricating material to the bearings for the oscillating arm. In such a system trouble is often experienced in operating the second pump for supplying lubricating material to the oscillating arm.

In a lubricating system constructed in accordance with my invention a single lubricating pump is provided for supplying lubricating material not only to the oscillating arm and the link connected to it but also to the guide for the reciprocating ram and to the various gears and bearings on the machine. The pump is operated directly in accordance with the operation of the machine and accordingly supplies lubricating material in accordance with the need therefor. Preferably, two connected pressure lines are provided for respectively supplying lubricating material under pressure to the bearings for the oscillating arm and the link connected to it and to a reservoir which supplies lubricating material to the various bearings and gears on the machine. Moreover, the pressure line connected to the reservoir is provided with an adjustable outlet which serves not only to supply lubricating material to various gear wheels but also to regulate the pressure of the lubricating material which is supplied by the two pressure lines. The pressure line which is connected to the oscillating arm and to the link is so attached to such members as to prevent any interference with the flow of lubricating material during the operation of the machine.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a shaping machine typifying machine tools to which this invention may be applied and, in such drawings, like characters of reference denote corresponding parts throughout all the views, of which:—

Figure 2:
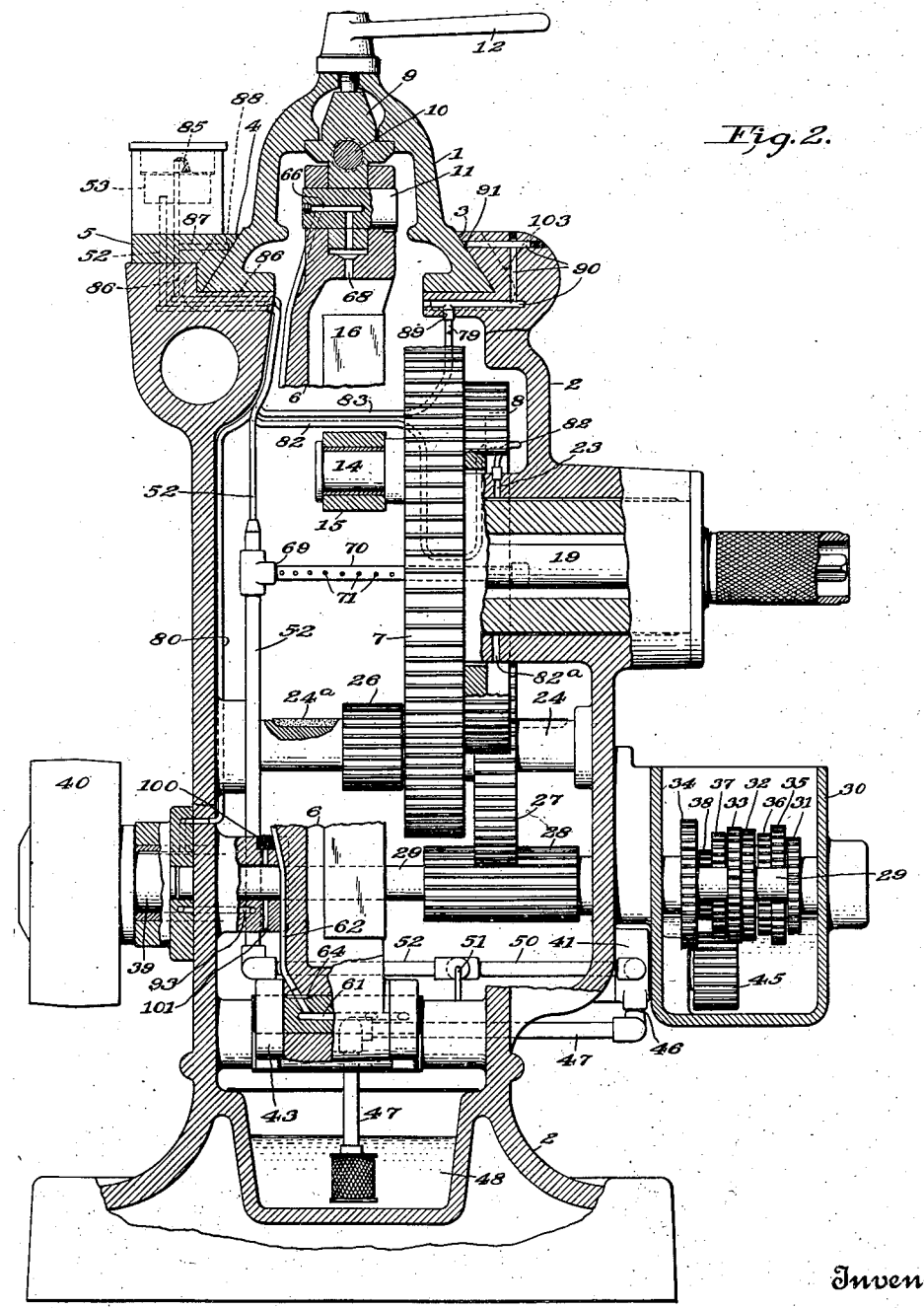

In the accompanying drawings, Figure 1 is an elevational view, with the front side of the frame removed, of a shaping machine provided with a lubricating system constructed in accordance with my invention. Fig. 2 is a sectional view taken along the line 2—2 of Fig. 1. Fig. 3 is a sectional view through the oscillating arm for operating the ram. Fig. 4 is a sectional view of the link along the line 4—4 of Fig. 1. Fig. 5 is a view, partly in section, of the outlet connected to one of the pressure lines and Fig. 6 is a sectional view along the line 6—6 of Fig. 5. Fig. 7 is a sectional view through the bull gear wheels and the oscillating arm. Fig. 8 is a detail view of the lubricating pump and the gears connected to it.

Referring to the drawings a shaping machine is illustrated comprising a reciprocating ram 1 which is moved along guideways 3 and 4 formed on a main frame 2. A wedge or strap 5 is secured to the frame for forming a part of the guideway 4. The ram 1 is reciprocated by means of an oscillating arm 6 which is operated by means of two bull gear wheels 7 and 8. A shoe 9, which is connected to the ram 1 by a screw shaft 10, is connected to the oscillating arm 6 by means of a pin 11. The pin 11 is preferably fixedly secured to the arm 6 by means of a set screw in order to insure a bearing surface between the pin and the shoe. A hand lever 12 is provided for securing the shoe 9 to the ram 1 by a clamping action.

The bull gear wheel 7 carries a crank pin 14 which is fitted to a crank pin block 15. The crank pin block 15 is fitted to a guideway 16 which is formed in the arm 6, as shown in Fig. 7 of the drawings. The crank pin 14 is secured to the bull gear wheel 7 by means of a screw shaft 18 which is operated by means of a shaft 19. The shaft 19, which extends to the front of the machine, has a squared end to be operated by means of a suitable crank handle. The screw shaft 18 is connected to the shaft 19 by bevel-gear wheels 20 and 20ª, as shown in Fig. 7 of the drawings. By means of the shaft 19, the bevel-gears 20 and 20ª and the screw shaft 18, the position of the crank pin 14 on the bull gear wheel 7 is varied to control the stroke of the ram.

The two bull gear wheels 7 and 8 are secured together and rotatably mounted in the frame 2 of the machine. The shaft 19, which controls the length of the ram stroke, projects through the center of the bull gear wheels. As shown in Figs. 1 and 2, the fluid conductor 82 conveys lubricating material from the reservoir 53 through the opening 23 formed in the frame to the bearing surfaces of the bull gear wheels 7 and 8.

A shaft 24, which is fixedly mounted on the frame 2, carries a bushing 25. The bushing 25 carries two gear wheels 26 and 27 which are adapted to be moved respectively into mesh with the bull gear wheels 7 and 8. The bushing 25, on which the gear wheels 26 and 27 are fixedly mounted is shifted to mesh either the gear wheels 26 with the gear wheel 7 or the gear wheel 27 with the gear wheel 8.

The gear wheel 27 meshes with an elongated pinion 28 which is fixedly mounted on a shaft 29. The shaft 29 is provided with suitable bearings in the frame of the machine and extends into a transmission gear case 30, as shown in Fig. 2 of the drawings. The pinion 28 is of such length as to mesh with the gear wheel 27 either when the gear wheel 26 meshes with the gear wheel 7 or when the gear wheel 27 meshes with the gear wheel 8. The shaft 29 carries gear wheels, 31, 32, 33 and 34 which are located within the gear box 30 and which form a part of a change gear system. The gear wheels 31 to 34, inclusive, are adapted to mesh with four gear wheels 35 to 38, inclusive, which are mounted on a main power shaft 39 and connected thereto by a spline connection. The gear wheels 35 to 38, inclusive, are selectively operated to mesh with the various gear wheels 31 to 34 in the customary manner to vary the speed of rotation of the shaft 29 and accordingly to control the speed of the machine. The shaft 39 carries a friction clutch pulley 40 which is connected to any suitable source of power.

A lubricating pump 41, which is secured to a bushing 42 in the transmission gear case 30, is provided for supplying lubricating material not only to the various gear wheels and the guideways for the ram 1 but also for supplying lubricating material to the bearings of the lever arm 6 and the link 43. A shaft 44 for the pump 41 projects through the bushing 42 and carries a gear wheel 45 ..ear the end thereof. In referring to Fig. 8 of the drawings it will be noted the gear wheel 45 is located within the gear case 30 and projects over a portion of the bushing 42. The gear wheel 45 meshes with the gear wheel 37, which is mounted on the shaft 39 and, accordingly, the pump is operated in accordance with the operation of the machine. An inlet 46 for the pump is connected by a system of pipes 47 to a reservoir 48 which is formed in the base of the main frame 2. The reservoir 48 serves to collect the excess lubricating material which has been supplied to the various bearing surfaces on the machine. The outlet 49 of the pump 41 is connected by pipes 50 to a pressure line 51, which is connected to the bearings for the link 43 and the bearings for the arm 6 and to a pressure line 52. The pressure line 52 is connected to a supply reservoir 53. The supply reservoir is located at the top of the machine and is preferably mounted on the ram wedge, as shown in Fig. 2 of the drawings.

The link 43, which is connected to the arm 6, is pivotally mounted on the main frame 2 of the machine by means of a pin 54, as shown in Figs. 1 and 4 of the drawings. The pin 54 is secured against rotation in the frame 2 by means of a set screw 54$^a$. The opposite end of the link 43 is connected to the arm 6 by means of a pin 55 which is held against rotation in the link 43 by means of a set screw 56.

The pressure line 51 from the pump 41 is connected to a hole 57 which extends through one bearing for the pin 54 in the frame 2 and a portion of the pin 54 to a hole 58 which is formed in the center of the pin 54 as shown in Fig. 4 of the drawings. The hole 58 in the center of the pin 54, which is closed at one end by a plug 59, is connected to a hole 60 which is formed in one arm of the link 43. The hole 60 is connected to a hole 61 that is formed in the center of the pin 55. The hole 61 through the center of the pin 55 is connected to a tube 62 which extends along the arm 6. A figure 8 oil groove 63 is formed in the pin 54 for supplying lubricating material to the bearing surface between the link 43 and the pin. A similar oil groove 64 is provided for supplying lubricating material to the bearing surface between the pin 55 and the rocker arm 6.

The conducting tube 62, which is secured to the side of the arm 6, extends to the top of the arm and connects with a hole 65. The hole 65 connects with a hole 66 which is formed in the center of the pin 11 as shown in Figs. 1, 2 and 3 of the drawings. The hole 66 through the center of the pin 11 is connected to an oil groove 67 for supplying lubricating material to the bearing surface between the pin 11 and the shoe 9. An opening 68 is provided in the lower part of the bearing for supplying the excess lubricating material therefrom to the guideway 16 in the arm 6 for the sliding block 15. Openings are formed in the lower end of the rocker arm 6 to permit the excess oil to drain into the reservoir 48 at the bottom of the machine.

The pressure line 52, which is connected to the reservoir 53 at the top of the machine, is provided with an outlet 69 for controlling the pressure of the lubricating material in the two pressure lines 51 and 52. A tube 70, which is connected to the outlet 69, has a number of openings 71 formed therein as indicated in Figs. 5 and 6 of the drawings. A second tube 72, which is fitted to the inside of the tube 70, is provided with a series of holes 73 which correspond to the holes 71 in the tube 70. A knob 74, which is secured to the end of the tube 72, serves not only as a means for sliding the tube 72 in the tube 70 but also as a means for closing the end of the inner tube. A set screw 75, which is secured to the inner tube 70 projects through a slot 76 in the tube 70. The set screw 75 not only serves as a means for clamping the inner tube in any set position but also serves to limit the longitudinal movement of the inner tube. When the inner tube is in the extreme position towards the right, as viewed in Fig. 5, the holes 73 in the inner tube exactly match the holes 71 in the outer tube 70. A movement of the inner tube towards the left serves to restrict the openings through the two sets of holes 71 and 73. By the above mechanism the fluid pressure in the line 52 and also in the line 51 is controlled at will.

The reservoir 53, which is supplied with lubricating material by the pressure line 52, supplies lubricating material to seven fluid conductors 78 to 84, inclusive. The fluid conductors 78, 79, 80, 82, 83 and 84, are supplied with lubricating material by wicks 85 which extend into the conductors and dip into the lubricating material within the reservoir. The fluid conductor 78 serves to supply lubricating material to the forward end of the guideway 4 formed in part of the ram wedge 5. The fluid conductor 78 connects with two holes 86 which are formed in the frame 2 of the machine and in the ram wedge 5, as shown in Fig. 1 of the drawings. A hole 87 which is formed in the wedge, connects with a suitable groove 88 on the bearing surface of the wedge.

The fluid conductor 79 serves to supply lubricating material to the forward end of the guideway 3. The conductor 79 extends from the wedge side of the machine around the path of movement of the lever arm 6 to a hole 89 which is formed in the frame of the machine as shown in Fig. 1. The hole 89 is connected through a system of holes 90 in the frame to an oil groove 91 in the guideway 3.

The fluid conductor 80 supplies lubricating material to a bearing for the main shaft 39. An outlet 93 is formed in the lower end of the bearing for the shaft 39 to drain away the surplus lubricating material. The fluid conductor 81 not only serves as an overflow for the reservoir but distributes lubricating material on the moving parts below the reservoir. The fluid conductor 82 supplies lubricating material to the main bearing which supports the two bull gears 7 and 8. An outlet 82$^a$ is shown for draining the lubricating material into the reservoir at the bottom of the frame.

The fluid conductor 83 passes from the ram wedge side of the machine along the rear wall of the frame out of the path of the movement of the oscillating arm 6 to the opposite side of the machine for lubricating the rear portion of the guide surface 3. The fluid conductor 83 is connected to the oil groove 91 in a manner similar to the connection of the fluid conductor 79 to the oil groove. The fluid conductor 84 supplies lubricating material to the rear portion of the oil groove 88 which is formed in the ram wedge 5. The fluid conductor 84 is connected to the oil groove 88 in a manner similar to the connection of the fluid conductor 78 to the oil groove.

Although no special provision is made to carry the lubricating material from the ram guideways back into the frame to be collected by the reservoir 48, it should be noted felt wipers 102 and 103 which are attached to each end of the frame surrounding the guideways serve to prevent the escape of any lubricating material. The surplus lubricating material will accordingly be drained into the frame of the machine. The lubricating material flowing through the outlet 69 supplies lubricating material directly to the various gear wheels contained within the frame of the machine. Moreover, the outlet 69 supplies lubricating material to the felt 21ª carried in a groove on the shaft 24. The outlet 69 also supplies lubricating material through an opening 100 to the bearing for the shaft 29, as shown in Fig. 1 of the drawings. An outlet 101 in the lower side of the bearing permits the lubricating material to be drained into the reservoir 48.

In the above described lubricating system for the shaping machine it will be noted one pump is provided for supplying lubricating material to the various bearing surfaces and gear wheels in the machine. The gear case 30 may be filled to a predetermined level with lubricating material or may be supplied with lubricating material from the pump as desired.

Although only seven fluid conductors have been shown connected to the reservoir 53, it is to be understood that any desired number of such fluid conductors may be supplied with lubricating material from the reservoir.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. In a shaping machine, in combination, a frame providing spaced guideways; a ram slidingly fitted to said guideways; a crank mechanism; driving means for said crank mechanism; an oscillating lever actuated by said crank mechanism, said lever being operatively connected with said ram to reciprocate the latter; a link pivotally connected with one end of said lever; a lubricant reservoir; a pump and conduits for conveying lubricant from said reservoir to said guideways and to said driving means; and a second lubricant conduit connected with said pump and comprising sections carried by and bodily movable with said link and lever for delivering lubricant under pressure from said pump to the pivotal connections of said lever and link.

2. In a shaping machine, in combination, a frame; a ram slidably mounted upon said frame; a lever pivotally connected with said ram; a link pivotally connected at one end to said frame and at its other end to said lever, said link affording a floating fulcrum for said lever; a rotating crank mechanism having a sliding connection with said lever for oscillating the latter and thereby effecting reciprocations of the ram; a lubricant pump operated in accordance with the operation of said crank mechanism; a lubricant conduit connecting said pump with the fixed pivot of said link; and a lubricant conductor passing through said link and along said lever continuously to lubricate the pivotal connections at the opposite ends of said lever.

3. In a device of the character described, the combination of a frame, a ram reciprocable thereon, a rocker-arm, a link, an upper bearing between the upper end of said rocker-arm and said ram, a lubricant passage for said upper bearing extending upwardly lengthwise of said rocker-arm, and lubricant feeding means communicating with the lower end of said lubricant passage, and the upper end of said lubricant passage discharging lubricant for said upper bearing.

4. In a device of the character described, the combination of a frame, a ram having guide connection therewith, a rocker-arm, a lower bearing for the lower end of said rocker-arm, a crank-block having slide connection with said rocker-arm, a crank therein, upper bearing means between the upper end of said rocker-arm and said ram, a lubricant container, and lubricant passages therefrom through said lower bearing to said upper bearing means, arranged for upward passage of the lubricant between said lower bearing and said upper bearing means, and lubricant guiding means for gravity feed of the lubricant between said upper bearing means and said slide connection and said crank.

5. In a lubricating system for a shaping machine; the combination comprising an oscillating arm for reciprocating a ram on the frame of the machine; a link for anchoring one end of the arm; a pump and a first conducting means for supplying lubricating material to the machine bearings; second conducting means for supplying lubricating material under pressure of the pump to the bearings for the arm and the link; and means embodied in the first conducting means for varying the pressure of the lubricating material supplied by said pump to the bearings for the arm and the link.

6. In a lubricating system for a shaping machine, the combination comprising an oscillating arm for operating a reciprocating ram; a crank pin block mounted in guideways on said arm and serving to oscillate the arm; a pump for supplying lubricating material to the machine bearings; conducting means including a conduit movable with said arm for supplying lubricating material under the pressure of the pump to the bearings for said arm; and means for supplying lubricating material from one of said arm bearings to the guideway on the arm.

7. In a lubricating system for a shaping machine having an oscillating arm for reciprocating a ram, the combination comprising a reservoir for supplying lubricating material to various parts of the machine; a lubricating pump; and connecting means from said pump to the reservoir and to bearings for said arm, said connecting means having an opening for adjusting the pressure of the lubricating material supplied to the bearings of the arm and for lubricating various operating gears in the shaper.

8. In a lubricating system for a shaping machine, the combination comprising an oscillating arm for reciprocating a tool carrying ram; a link connected to said arm; gearing mechanism for operating the arm; a reservoir for supplying lubricating material to the guides for the ram and to various bearings on the machine; a pump operated by said mechanism in accordance with the operation of the shaping machine; an outlet from said pump having a connection to said reservoir and a connection for supplying lubricating material under pressure to the bearings for said arm and the link; a conductor leading from the connection to said reservoir for supplying lubricating material to gears in said mechanism; and means for varying the discharge of lubricating material from said conductor to vary the pressure of the lubricating material supplied to the bearings for the arm and the link.

9. In a shaping machine, in combination, a frame; a ram slidingly mounted on said frame; an eccentric device; a motion-converting mechanism having a sliding connection with said eccentric device and comprising a first member pivotally connected to said frame, a second member pivotally connected with said first member and also pivotally connected with said ram, said motion-converting mechanism serving to effect reciprocatory motion in said ram from rotary motion in said eccentric device; a lubricant reservoir in the base of said frame; a lubricant pump adapted to draw lubricant from said reservoir; a lubricant conduit extending from said pump to said pivotal connections to conduct thereto lubricant under pressure; and means permitting lubricant to fall by gravity from one of said pivotal connections to the sliding connection between the eccentric device and the motion-converting mechanism and thence back to said reservoir.

10. In a shaping machine combining a frame; guideways provided thereby; a ram reciprocable in said guideways; an oscillating arm having pivotal connections at each end for reciprocating said ram; a circulatory lubricating system comprising a main reservoir in the base portion of said frame, an auxiliary reservoir adjacent one of said guideways; lubricant ducts connecting said auxiliary reservoir with said guideways; a lubricant conduit connected with the pivotal connections of said arm; and means to supply lubricant to said auxiliary reservoir and to said conduit.

11. In a shaping machine combining a frame providing spaced guideways; a ram reciprocable on said guideways; an oscillating arm; an oscillating link pivotally connected to one end of said arm, one of said oscillating elements being pivotally connected to the frame and the other being pivotally connected with said ram; a lubricant conduit extending lengthwise of said arm and link and connected with all of said pivotal connections; and means continuously to supply lubricant to said conduit thereby to lubricate all of said pivotal connections.

12. A shaping machine combining a frame providing guideways; a ram reciprocable on said guideways; an auxiliary reservoir adjacent said ram; conduits connecting said reservoir with said guideways; an oscillating arm; a crank-pin block mounted in guideways on said arm and serving to oscillate the arm; a link having one end pivotally connected to one end of said arm, the other ends of the two being pivotally connected with the frame and the ram; a lubricant duct arranged to deliver lubricant to all of said pivotal connections and to the guideway on said arm; a main reservoir at the bottom of said frame; and means to deliver lubricant from said main reservoir to said auxiliary reservoir and to said duct.

13. In a circulatory lubricating system for a shaping machine the combination of a ram;